United States Patent
Francois et al.

(10) Patent No.: US 9,781,446 B2
(45) Date of Patent: Oct. 3, 2017

(54) METHOD FOR CODING AND METHOD FOR DECODING A BLOCK OF AN IMAGE AND CORRESPONDING CODING AND DECODING DEVICES

(75) Inventors: Edouard Francois, Bourg des Comptes (FR); Dominique Thoreau, Cesson Sevigne (FR); Jerome Vieron, Paris (FR); Philippe Bordes, Cesson Sevigne (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 720 days.

(21) Appl. No.: 13/514,989
(22) PCT Filed: Nov. 25, 2010
(86) PCT No.: PCT/EP2010/068181
§ 371 (c)(1),
(2), (4) Date: Sep. 4, 2012
(87) PCT Pub. No.: WO2011/069831
PCT Pub. Date: Jun. 16, 2011

(65) Prior Publication Data
US 2012/0320982 A1 Dec. 20, 2012

(30) Foreign Application Priority Data
Dec. 10, 2009 (FR) ...................................... 09 58824

(51) Int. Cl.
*H04N 7/32* (2006.01)
*H04N 19/573* (2014.01)
(Continued)

(52) U.S. Cl.
CPC ......... *H04N 19/573* (2014.11); *H04N 19/105* (2014.11); *H04N 19/139* (2014.11);
(Continued)

(58) Field of Classification Search
CPC ....... H04N 19/00; H04N 19/53; H04N 19/593
See application file for complete search history.

(56) References Cited

U.S. PATENT DOCUMENTS

| | | |
|---|---|---|
| 6,023,298 A | 2/2000 | Hwang |
| 2002/0009144 A1 | 1/2002 | Ishihara et al. |
| | (Continued) | |

FOREIGN PATENT DOCUMENTS

| | | |
|---|---|---|
| CN | 101415122 | 4/2009 |
| KR | 2001057768 | 7/2001 |
| | (Continued) | |

OTHER PUBLICATIONS

Suzuki et al., "Inter Frame Coding with Template Matching Averaging", Image Processing, 2007. ICIP 2007, Sep. 1, 2007, pp. III-409.
(Continued)

*Primary Examiner* — Jorge L Ortiz Criado
*Assistant Examiner* — Kyle Lotfi
(74) *Attorney, Agent, or Firm* — Tutunjian & Bitetto, P.C.

(57) ABSTRACT

A method for decoding a stream of coded data to reconstruct a current block of a sequence of images is disclosed. The method comprises the steps of:
reconstructing for the current block a first item of motion data from a stream of coded data,
identifying a first prediction block with the first item of motion data,
determining a second item of motion data by template matching,
identifying a second prediction block with the second item of motion data,
reconstructing the current block from the first and second prediction blocks.
The step of determination of the second item of motion data is a function of the first distortion calculated between the first prediction block and the second prediction block.

20 Claims, 4 Drawing Sheets

(51) Int. Cl.

| | | |
|---|---|---|
| *H04N 19/593* | (2014.01) | |
| *H04N 19/105* | (2014.01) | |
| *H04N 19/139* | (2014.01) | |
| *H04N 19/176* | (2014.01) | |
| *H04N 19/147* | (2014.01) | |
| *H04N 19/46* | (2014.01) | |
| *H04N 19/51* | (2014.01) | |
| *H04N 19/61* | (2014.01) | |

(52) U.S. Cl.
CPC ......... *H04N 19/147* (2014.11); *H04N 19/176* (2014.11); *H04N 19/46* (2014.11); *H04N 19/51* (2014.11); *H04N 19/593* (2014.11); *H04N 19/61* (2014.11)

(56) References Cited

U.S. PATENT DOCUMENTS

| | | |
|---|---|---|
| 2007/0009044 A1 | 1/2007 | Tourapis et al. |
| 2008/0159400 A1 | 7/2008 | Lee et al. |
| 2008/0159401 A1 | 7/2008 | Lee et al. |
| 2009/0003443 A1 | 1/2009 | Guo |
| 2009/0067505 A1 | 3/2009 | Tourapis et al. |
| 2009/0180538 A1 | 7/2009 | Visharam et al. |
| 2009/0225847 A1 | 9/2009 | Min et al. |
| 2010/0208814 A1 | 8/2010 | Xiong et al. |

FOREIGN PATENT DOCUMENTS

| | | | | |
|---|---|---|---|---|
| WO | WO2007/093629 | | 8/2007 | |
| WO | WO2009028780 | | 3/2009 | |
| WO | WO2009126260 | * | 10/2009 | ............... H04N 7/26 |
| WO | WO2011002809 | * | 1/2011 | ............... H04N 7/36 |

OTHER PUBLICATIONS

Search Report Dated Jan. 14, 2011.
Kamp et al., "Multihypothesis prediction using decoder side motion vector derivation in inter frame video coding", Conference on Visual Communication and Image Processing 2009, San José, California, USA, Jan. 20, 2009, pp. 1-9.
Richardson, I., "H264 and MPEG4 Video Compression", John Wiley & Sons Ltd., West Sussex, England, 2003, pp. 1-307.

* cited by examiner

METHOD FOR CODING AND METHOD FOR DECODING A BLOCK OF AN IMAGE AND CORRESPONDING CODING AND DECODING DEVICES

This application claims the benefit, under 35 U.S.C. §365 of International Application PCT/EP2010/068181, filed Nov. 25, 2010, which was published in accordance with PCT Article 21(2) on Jun. 16, 2011 in English and which claims the benefit of French patent application No. 0958824, filed Dec. 10, 2009.

1. SCOPE OF THE INVENTION

The invention relates to the general domain of image coding.

More specifically, the invention relates to a method for coding a block of a sequence of images and a method for reconstructing such a block.

2. PRIOR ART

It is known in the prior art that to code a current block of a sequence of images to predict this block from one or several reference blocks. More specifically the current block is predicted by a prediction block equal to the reference block or a filtered version of the reference block or again to a merging of several reference blocks. The prediction block is then extracted, for example by difference pixel by pixel, from the current block. The block of residues thus obtained is then coded in a stream of coded data.

Figure 1:
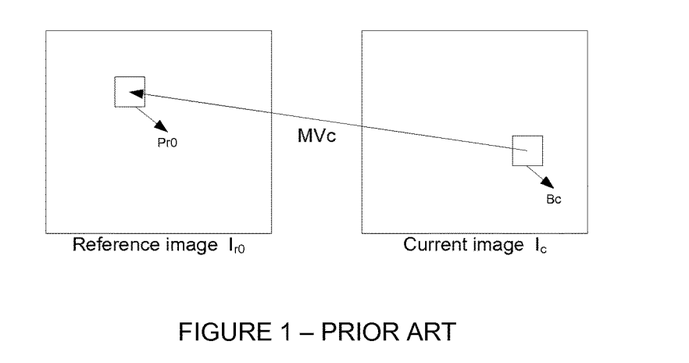
FIG. 1 shows a method for prediction of a current block according to a first method of the prior art.

In reference to FIG. 1, it is known that the current block Bc of the current image Ic is predicted from a reference block belonging to an image previously coded and reconstructed Ir0, known as the reference image. The reference block Pr0 is identified in this reference image Ir0 using motion data MVc itself coded in the stream. The reference image Ir0 temporally precedes or follows the current image Ic in the display order.

Figure 2:
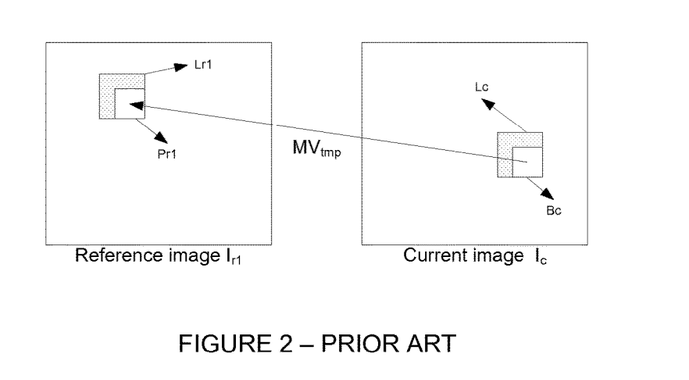
FIG. 2 shows a method for prediction of a current block according to a second method of the prior art.

In reference to FIG. 2, it is also known that the current block Bc is predicted from a reference block Pr1 belonging to an image previously coded and reconstructed Ir1, known as the reference image. The reference image Ir1 temporally precedes or follows the current image Ic in the display order. The reference block Pr1 is identified in this reference image Ir1 using a "template" Lc. The template Lc, known as the current template, is a group of pixels neighbouring the current block Bc not necessarily adjacent to this current block coded and reconstructed previous to the current block. To determine the reference block Pr1, a reference template Lr1 resembling to the current template Lc is sought in the reference image Ir1. The resemblance criterion is for example a sum of the square or of the absolute value of differences pixel by pixel between the template neighbouring the current block and the sought template. Hence, the more the reference template Lr1 resembles the current template Lc, the more the absolute value or the sum of the square of differences pixel by pixel is small. Once the reference template Lr1 is determined in the reference image Ir1, the reference block Pr1 is identified as being the block that occupies relative to the reference template Lr1 the same position as the current block Bc relative to the current template Lc. In the case where the template is used to identify the reference block Pr1 no motion vector is coded in the stream. It should be noted that this technique known under the term "template matching" can also be used when the reference image Ir1 is the current image Ic. In this latter case, the reference template Lr1 is sought in the part of the current image coded and reconstructed previous to the current block.

Figure 3:
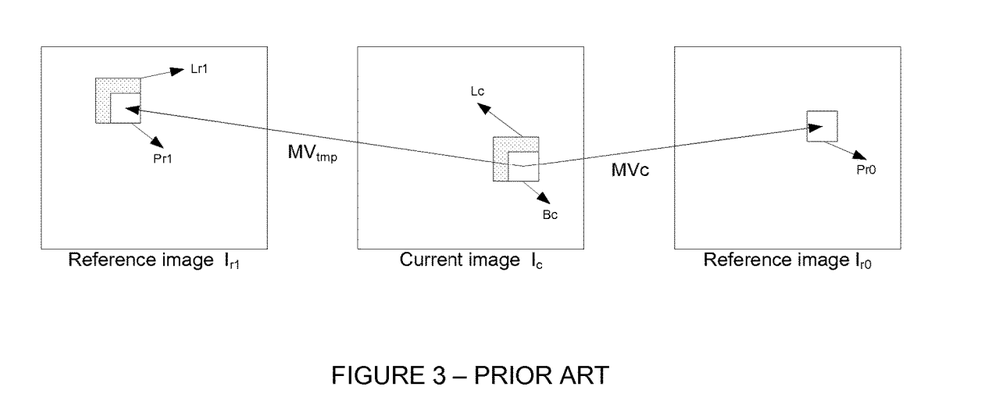
FIG. 3 shows a method for prediction of a current block according to a third method of the prior art.

In reference to FIG. 3, it is also known that the current block Bc is predicted from a first reference block Pr0 and a second reference block Pr1. The first reference block Pr0 is identified in the first reference image Ir0 using motion data MVc and the second reference block is identified in the second reference image Ir1 for example by the template matching technique. The current block Bc is predicted by a prediction block equal to the average of the first and second reference blocks. The prediction block is then extracted, for example by difference pixel by pixel, from the current block. The block of residues thus obtained is then coded in a stream of coded data.

These techniques are not always efficient notably at low and medium bitrate. In particular the block Pr1 is not always pertinent, i.e. it does not predict sufficiently precisely the current block Bc. It thus results in an extra coding cost.

3. SUMMARY OF THE INVENTION

The purpose of the invention is to overcome at least one of the disadvantages of the prior art. For this purpose, the invention relates to a method for reconstruction of a current block of a sequence of images having the form of a stream of coded data. The method for reconstruction comprises the following steps for:

reconstructing for the current block a first item of motion data from the stream of coded data, identifying a first prediction block with the first item of motion data, determining a second item of motion data by template matching, identifying a second prediction block with the second item of motion data, and reconstructing the current block from the first and second prediction blocks.

Advantageously, the step of determination of the second motion data is a function of the first distortion calculated between the first prediction block and the second prediction block.

According to a particular aspect of the invention, the step of determination of the second item of motion data comprises the minimisation of a distortion equal to the sum of the first distortion weighted by a coefficient and a second distortion, the second distortion being calculated between a current template neighbouring the current block and a reference template previously reconstructed.

According to a particular characteristic, the coefficient is equal to 0.5.

According to another particular characteristic, the method for reconstruction also comprises a step of reconstruction of the coefficient from the stream of coded data.

According to a variant, the method for reconstruction also comprises a step of calculation of the coefficient according to the following formula:

$$\sigma_1^2/(\sigma_0^2+\sigma_1^2)$$

where $\sigma_0$ is the deviation type of a residue calculated between the current template and a corresponding template associated with a first prediction block, and $\sigma_1$ is the deviation type of the residue calculated between the current template and the reference template corresponding to a second item of motion data.

The invention also relates to a method for coding a current block of a sequence of images comprising the following steps for:
- determining for the current block a first item of motion data,
- identifying a first prediction block with the item of motion data,
- determining a second item of motion data by template matching,
- identifying a second prediction block with the second item of motion data, and
- coding the current block from the first and second prediction blocks.

Advantageously, the step of determination of the second motion data is a function of the first distortion calculated between the first prediction block and the second prediction block.

According to a particular aspect of the invention, the step of determination of the second item of motion data comprises the minimisation of a distortion equal to the sum of the first distortion weighted by a coefficient and a second distortion, the second distortion being calculated between a current template neighbouring the current block and a reference template previously reconstructed.

According to a particular characteristic, the coefficient is equal to 0.5.

According to another particular characteristic, the method for coding also comprises a step of reconstruction of the coefficient from the stream of coded data.

According to a variant, the method for coding also comprises a step of calculation of the coefficient according to the following formula:

$$\sigma_1^2/(\sigma_0^2+\sigma_1^2)$$

where $\sigma_0$ is the deviation type of a residue calculated between the current template and a corresponding template associated with the first prediction block,
and $\sigma_1$ is the deviation type of the residue calculated between the current template and the reference template corresponding to a second item of motion data.

4. LIST OF FIGURES

The invention will be better understood and illustrated by means of embodiments and advantageous implementations, by no means limiting, with reference to the figures in the appendix, wherein.

5. DETAILED DESCRIPTION OF THE INVENTION

An image sequence is a series of several images. Each image comprises pixels or image points, with each of which is associated at least one item of image data. An item of image data is for example an item of luminance data or an item of chrominance data.

The term "motion data" is to be understood in the widest sense. It comprises the motion vectors and possibly the reference image indexes enabling a reference image to be identified in the image sequence. It can also comprise an item of information indicating the interpolation type used to determine the prediction block. In fact, in the case where the motion vector associated with a block Bc does not have integer coordinates, the image data must be interpolated in the reference image Iref to determine the prediction block. The motion data associated with a block are generally calculated by a motion estimation method, for example by block pairing. However, the invention is in no way limited by the method enabling a motion vector to be associated with a block.

The term "residual data" signifies data obtained after extraction of other data. The extraction is generally a subtraction pixel by pixel of prediction data from source data. However, the extraction is more general and comprises notably a weighted subtraction. The term "residual data" is synonymous with the term "residues". A residual block is a block of pixels with which residual data is associated.

The term "transformed residual data" signifies residual data to which a transform has been applied. A DCT (Discrete Cosine Transform) is an example of such a transform described in chapter 3.4.2.2 of the book by I. E. Richardson entitled "H.264 and MPEG-4 video compression", published by J. Wiley & Sons in September 2003. The wavelet transform described in chapter 3.4.2.3 of the book by I. E. Richardson and the Hadamard transform are other examples. Such transforms "transform" a block of image data, for example residual luminance and/or chrominance data, into a "block of transformed data" also called a "block of frequency data" or a "block of coefficients". The term "prediction data" signifies data used to predict other data. A prediction block is a block of pixels with which prediction data is associated. A prediction block is obtained from a block or several blocks of the same image as the image to which belongs the block that it predicts (spatial prediction or intra-image prediction) or from one (mono-directional prediction) or several blocks (bi-directional prediction) of a different image (temporal prediction or inter-image prediction) of the image to which the block that it predicts belongs.

The term "prediction mode" specifies the way in which the block is coded. Among the prediction modes, there is the INTRA mode that corresponds to a spatial prediction and the INTER mode that corresponds to a temporal prediction. The prediction mode possibly specifies the way in which the block is partitioned to be coded. Thus, the 8×8 INTER prediction mode associated with a block of size 16×16 signifies that the 16×16 block is partitioned into 4 8×8 blocks and predicted by temporal prediction.

The term "reconstructed data" signifies data obtained after merging of residual data with prediction data. The merging is generally a sum pixel by pixel of prediction data to residual data. However, the merging is more general and comprises notably the weighted sum. A reconstructed block is a block of pixels with which reconstructed image data is associated.

A neighbouring block or neighbouring template of a current block is a block respectively a template situated in a more or less large neighbourhood of the current block but not necessarily adjacent to this current block.

The term coding is to be taken in the widest sense. The coding can possibly but not necessarily comprise the transformation and/or the quantization of image data. Likewise, the term coding is used even if the image data are not explicitly coded in binary form, i.e. even when a step of entropy coding is omitted.

Figure 4:
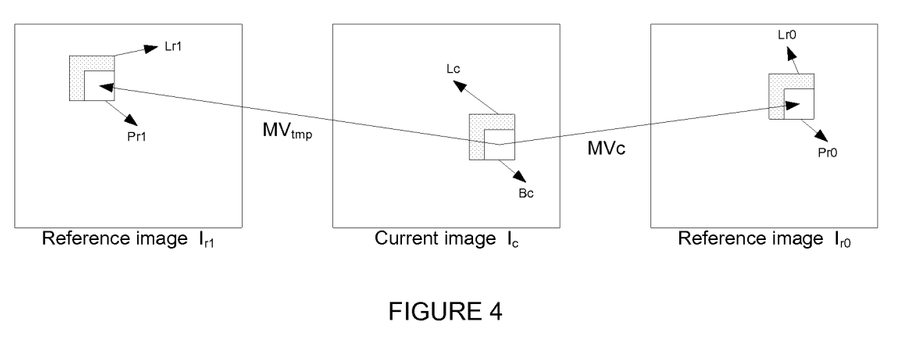
FIG. 4 shows a method for prediction of a current block according to the invention.
Figure 5:
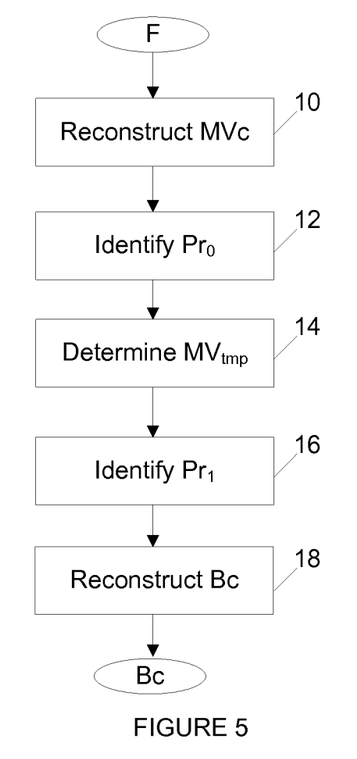
FIG. 5 shows a method for reconstruction of a current block according to the invention.

In reference to FIGS. 4 and 5, the invention relates to a method for reconstruction of a current block Bc of a sequence of images having the form of a stream F of coded data. The current block Bc belongs to a current image Ic.

During a step 10, a first item of motion data MVc is reconstructed from the stream F of coded data. For this purpose, the coded data of the stream F representative of the first item of motion data MVc are decoded. The invention is in no way limited by the method used to reconstruct the first item of motion data MVc. According to a particular embodiment, the first item of motion data MVc is reconstructed by prediction from motion data previously reconstructed. During a step 12, a first prediction block Pr0 is identified with said first item of motion data MVc in a first reference image Ir0.

During a step 14, at least one second item of motion data MVtmp is determined by a template matching method. When several reference images are available, the template matching method is applied for example for the different reference images and the motion data MVtmp is retained, i.e. the reference image Ir1 and the associated vector, providing the lowest distortion on the current template Lc.

In reference to FIG. 2, it is known that the second item of motion data MVtmp is determined as follows:

$$MV_{tmp} = \arg\min_{MV}\left(\sum_p (L_c[p] - L_{r1}[p + MV])^2\right)$$

where p designates a pixel and Lc[p] is the value of the item of image data associated in the current template Lc with the pixel p. The current template Pc is located in the causal neighbourhood of the current block Bc.

MVtmp is thus the motion data that minimises a first distortion D1 calculated between the current template Lc and a reference template Lr1 that belongs to a second reference image Ir1.

According to the invention, the step of determination of the second item of motion data is a function of the first distortion calculated between the first prediction block Pr0 and the second prediction block Pr1. Advantageously, the choice of the second item of motion data MVtmp is no longer only a function of the current template Lc and the reference template Lr1 that belongs to the second reference image Ir1. In fact, the first item of reconstructed motion data MVc is considered as reliable. Consequently, the block Pr0 is used to guide the determination of the second item of motion data MVtmp.

For example, the second item of motion data MVtmp is determined as follows:

$$MV_{tmp} = \arg\min_{MV}\left(\sum_p (L_c[p] - L_{r1}[p + MV])^2 + a \cdot \sum_p (Pr0[p] - Pr1[p + MV])^2\right)$$

MVtmp is thus the item of motion data that minimises a distortion equal to the sum of the first distortion D1 and a second distortion D2 weighted by the coefficient 'a', the second distortion D2 being calculated between the first prediction block Pr0 and the second prediction block Pr1.

'a' is a weighting coefficient that enables the influence of the second distortion D2 to be weighed according to the confidence accorded to the prediction Pr0. More specifically, the confidence is representative of the pertinence of the prediction Pr0 used to predict Bc. According to a first embodiment the value of the coefficient 'a' is fixed a priori. For example, 'a' is equal to ½.

According to another embodiment, the coefficient 'a' is reconstructed from the stream F. In this case the coefficient 'a' is coded in the stream F per image, per block or per image slice.

According to another variant, the coefficient 'a' is calculated according to the following formula:

$$\sigma_1^2/(\sigma_0^2+\sigma_1^2)$$

where: —where $\sigma_0$ is the deviation type of the residue calculated between the current template Lc and a corresponding template Lr0 associated with the first prediction block Pr0, and $\sigma_1$ is the deviation type of the residue calculated between the current template Lc and a reference template Lr1 corresponding to a given item of motion data MVtmp (for example the first tested).

Lr0 is a template associated with the block Pr0 that occupies relative to this block the same position as the current template Lc relative to the current block Bc.

During a step 16, a second prediction block Pr1 is identified with said second item of motion data MVc in a first reference image Ir1.

During a step 18, the current block Bc is reconstructed from the first prediction block Pr0 and the second prediction block Pr1. More specifically, the first prediction block Pr0 and the second prediction block Pr1 are merged, for example by making their average, into a unique prediction block Pr. This prediction block Pr is then merged, for example by addition pixel by pixel, to a block of residues reconstructed for the current block from the stream F.

According to a variant the first and second reference images are a single and same image.

Figure 6:
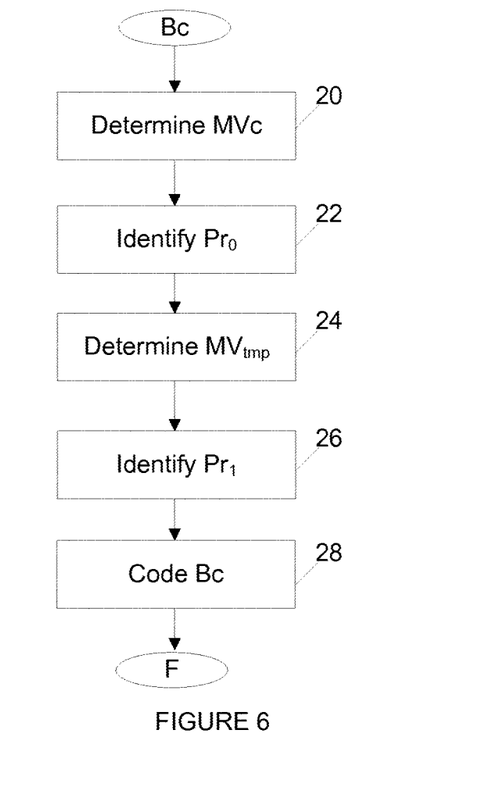
FIG. 6 shows a method for coding of a current block according to the invention.

In reference to FIG. 6, the invention relates to a method for coding a current block Bc of a sequence of images into a stream of coded data F. During a step 20, a first item of motion data MVc is determined, for example according to a standard block matching method. The invention is in no way limited by the method used to determine the first item of motion data MVc. During a step 22, a first prediction block Pr0 is identified with said first item of motion data MVc in a first reference image Ir0.

During a step 24, at least one second item of motion data MVtmp is determined by a template matching method. When several reference images are available, the template matching method is applied for example for the different reference images and the motion data MVtmp is retained, i.e. the reference image Ir1 and the associated vector, providing the lowest distortion on the current template Lc.

In reference to FIG. 2, it is known that the second item of motion data MVtmp is determined as follows:

$$MV_{tmp} = \arg\min_{MV}\left(\sum_p (L_c[p] - L_{r1}[p + MV])^2\right)$$

where p designates a pixel and Lc[p] is the value of the item of image data associated in the current template Lc with the pixel p. The current template Pc is located in the causal neighbourhood of the current block Bc.

MVtmp is thus the motion data that minimises a first distortion D1 calculated between the current template Lc and a reference template Lr1 that belongs to a second reference image Ir1.

According to the invention, the step of determination of the second item of motion data is a function of the first distortion calculated between the first prediction block Pr0 and the second prediction block Pr1. Advantageously, the choice of the second item of motion data MVtmp is no longer only a function of the current template Lc and the reference template Lr1 that belongs to the second reference image Ir1.

In fact, the first item of motion data MVc determined is considered as reliable. Consequently, the block Pr0 is used to guide the determination of the second item of motion data MVtmp.

Consequently, the block Pr0 is used to guide the determination of the second item of motion data MVtmp.

For example, the second item of motion data MVtmp is determined as follows:

$$MV_{tmp} = \operatorname*{arg\,min}_{MV}\left(\sum_{p}(L_c[p] - L_{r1}[p + MV])^2 + a \cdot \sum_{p}(Pr0[p] - Pr1[p + MV])^2\right)$$

MVtmp is thus the item of motion data that minimises a distortion equal to the sum of the first distortion D1 and a second distortion D2 weighted by the coefficient 'a', the second distortion D2 being calculated between the first prediction block Pr0 and the second prediction block Pr1.

'a' is a weighting coefficient that enables the influence of the second distortion D2 to be weighed according to the confidence accorded to the prediction Pr0. More specifically, the confidence is representative of the pertinence of the prediction Pr0 used to predict Bc. According to a first embodiment the value of the coefficient 'a' is fixed a priori. For example, 'a' is equal to ½.

According to another embodiment, the coefficient 'a' is coded in the stream F per image, per block or per image slice.

According to another variant, the coefficient 'a' is calculated according to the following formula:

$\sigma_1^2/(\sigma_0^2 + \sigma_1^2)$ where: —where $\sigma_0$ is the deviation type of the residue calculated between the current template Lc and a corresponding template Lr0 associated with the first prediction block Pr0, and $\sigma_1$ is the deviation type of the residue calculated between the current template Lc and a reference template Lr1 corresponding to a given item of motion data MVtmp (for example the first tested).

Lr0 is a template associated with the block Pr0 that occupies relative to this block the same position as the current template Lc relative to the current block Bc.

During a step 26, a second prediction block Pr1 is identified with said second item of motion data MVc in a first reference image Ir1.

During a step 28, the current block Bc is coded from the first prediction block Pr0 and the second prediction block Pr1. More specifically, the first prediction block Pr0 and the second prediction block Pr1 are merged, for example by making their average, into a unique prediction block Pr. The prediction block Pr is then extracted, for example by subtraction pixel by pixel, from the current block. The block of residues thus obtained is coded in the stream F. The first item of motion data MVc is also coded in the stream F either directly or by prediction. The invention is in no way limited by the method used to code the first item of motion data MVc.

According to a particular embodiment the first and second reference images are a single and same image.

Figure 7:
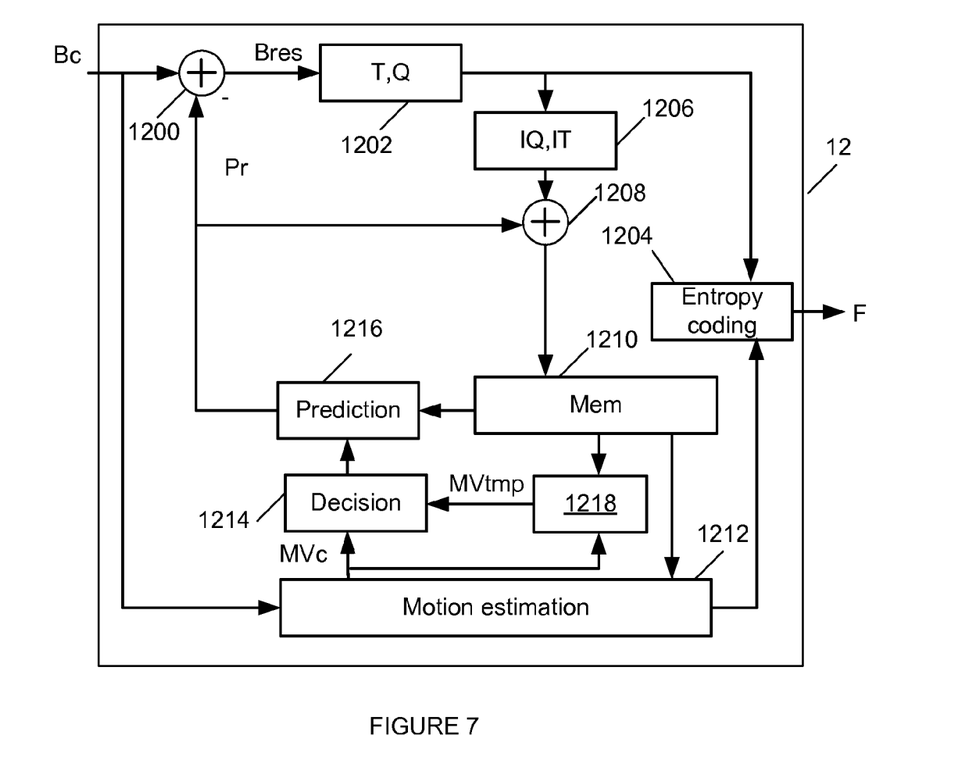
FIG. 7 shows a coding device according to the invention.
Figure 8:
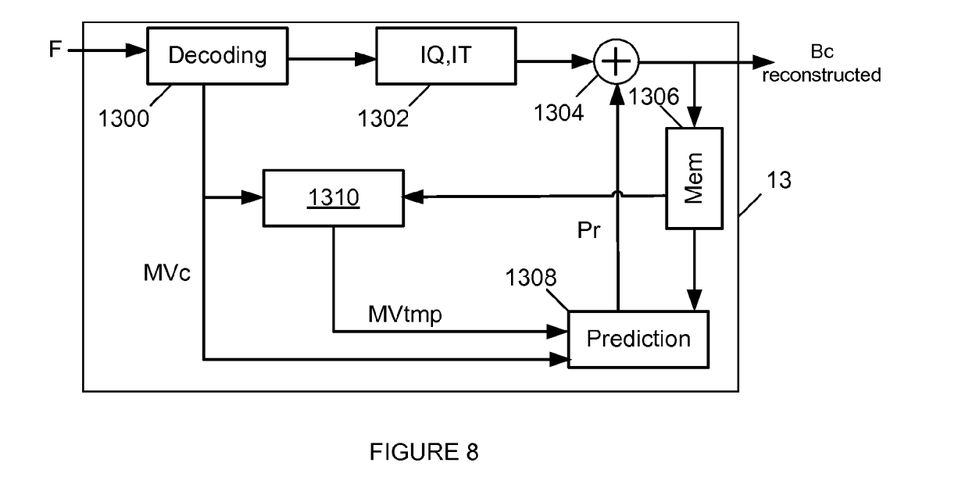
FIG. 8 shows a decoding device according to the invention.

The invention also relates to a coding device 12 described in reference FIG. 7 and a decoding device 13 described in reference to FIG. 8. In FIGS. 7 and 8, the modules shown are functional units, that may correspond or not to physically distinguishable units. For example, these modules or some of them can be grouped together in a single component, or constitute functions of the same software. Conversely, some modules may be composed of separate physical entities.

In reference to FIG. 7, the coding device 12 receives at input images belonging to a sequence of images. The coding device 12 is able to implement the coding method according to the invention described in reference to FIG. 6. Each image is divided into blocks of pixels with each of which is associated at least one item of motion data. The coding device 12 notably implements a coding with temporal prediction. Only the modules of the coding device 12 relating to the coding by temporal prediction or INTER coding are shown in FIG. 7. Other modules not shown and known by those skilled in the art of video coders implement the INTRA coding with or without spatial prediction. The coding device 12 notably comprises a calculation module 1200 able to extract, for example by subtraction pixel by pixel, from a current block Bc a prediction block Pr to generate a block of residual image data or residual block Bres. It further comprises a module 1202 able to transform then quantize the residual block Bres into quantized data. The transform T is for example a discrete cosine transform (or DCT). The coding device 12 further comprises an entropy coding module 1204 able to code the quantized data into a stream F of coded data. It also comprises a module 1206 performing the inverse operation of the module 1202. The module 1206 performs an inverse quantization $Q^{-1}$ followed by an inverse transformation $T^{-1}$. The module 1206 is connected to a calculation module 1208 capable of merging, for example by addition pixel by pixel, the block of data from the module 1206 and the prediction block Pr to generate a block of reconstructed image data that is stored in a memory 1210.

The coding device 12 further comprises a motion estimation module 1212 capable of estimating at least one motion vector between the block Bc and a block of a reference image Ir stored in the memory 1210, this image having previously been coded then reconstructed. According to a variant the motion estimation can be done between the current block Bc and the source reference image Ic in which case the memory 1210 is not linked to the motion estimation module 1212. The motion estimation module 1212 is able to implement the step 20 of the coding method according to the invention. According to a method known to those skilled in the art, the motion estimation module searches for in a reference image Ir0 an item of motion data, specifically a motion vector, so as to minimise an error calculated between the current block Bc and a block in the reference image Ir0 identified using the item of motion data. The coding device 12 also comprises a motion data reconstruction module 1218 that implements a template matching method. The motion data reconstruction module 1218 is able to implement step 24 of the coding method to generate an item of motion data MVtmp. The module 1212 and 1218 can be integrated in a single and unique component.

The motion data MVc, MVtmp determined are transmitted by the motion estimation module 1212 respectively by the motion data reconstruction module to a decision module 1214 able to select a coding mode for the block Bc in a predefined set of coding modes. The coding mode retained is for example that which minimizes a bitrate-distortion type criterion. However, the invention is not restricted to this selection method and the mode retained can be selected according to another criterion for example an a priori type criterion. The coding mode selected by the decision module 1214 as well as the motion data, for example the item or items of motion data in the case of the temporal prediction mode or INTER mode are transmitted to a prediction module 1216. The coding mode selected and in the contrary case the item or items of motion data MVc are also transmitted to the entropy coding module 1204 to be coded in the stream F. The prediction module 1216 determines the prediction block Pr from the coding mode determined by the decision module 1214 and possibly from motion data MVc, MVtmp determined by the motion estimation module 1212 and by the motion data reconstruction module 1218. The prediction module 1212 is able to implement the steps 22 and 26 of the reconstruction method according to the invention. The step of coding 28 of the coding method according to the invention is implemented by the modules 1200, 1202 and 1204 of the coding device 12.

In reference to FIG. 8, the decoding module 13 receives at input a stream F of coded data representative of a sequence of images. The stream F is for example transmitted by a coding device 12 via a channel. The decoding device 13 comprises an entropy decoding module 1300 able to generate decoded data, for example coding modes, motion data and decoded data relating to the content of the images. The entropy decoding module 1300 is particularly able to implement step 10 of the reconstruction method to generate an item of motion data MVc.

The decoding device 13 also comprises a motion data reconstruction module 1310 that implements for example a template matching method. The motion data reconstruction module 1310 is able to implement step 14 of the reconstruction method to generate an item of motion data MVtmp.

The decoded data relating to the content of the images is then transmitted to a module 1302 able to carry out an inverse quantization followed by an inverse transform. The module 1302 is identical to the module 1206 of the coding device 12 having generated the coded stream F. The module 1302 is connected to a calculation module 1304 able to merge, for example by addition pixel by pixel, the block from the module 1302 and a prediction module Pr to generate a reconstructed current block Bc that is stored in a memory 1306. The decoding device 13 also comprises a prediction module 1308. The prediction module 1308 determines the prediction block Pr from the coding mode decoded for the current block by the entropy decoding module 1300 and possibly from motion data MVc, MVtmp determined by the entropy decoding module 1300 respectively by the motion data reconstruction module 1310. The prediction module 1308 is able to implement the steps 12 and 16 of the reconstruction method according to the invention. The step of reconstruction 18 of the reconstruction method according to the invention is implemented by the modules 1302 and 1304 of the decoding device 13.

Naturally, the invention is not limited to the embodiment examples mentioned above.

In particular, those skilled in the art may apply any variant to the stated embodiments and combine them to benefit from their various advantages. Notably the invention is in no way limited by the method used to determine a motion vector MVc, or by the manner in which this vector is coded and respectively reconstructed.

The invention claimed is:

1. A method, in a video decoder, for decoding a stream of coded data to reconstruct a current block of a sequence of images comprising:
   decoding for said current block a first motion vector from a stream of coded data;
   identifying a first prediction block in a first reference image with said first motion vector,
   determining a second motion vector by template matching of a current template in a causal neighborhood of said current block;
   identifying a second prediction block in a second reference image with said second motion vector;
   reconstructing said current block from said first and second prediction blocks;
   wherein the determining of said second motion vector comprises minimizing a linear combination of first and second distortions, said first distortion being calculated between said first prediction block in said first reference image and said second prediction block in said second reference image and said second distortion being calculated between said current template in said causal neighborhood of said current block and a reference template in said second reference image.

2. The method according to claim 1, wherein said first distortion is weighted relative to said second distortion by a coefficient in said linear combination.

3. The method according to claim 2, wherein said coefficient is reconstructed from said stream of coded data.

4. The method according to claim 1, comprising calculating a coefficient according to the following formula:

$$\sigma_1^2/(\sigma_0^2+\sigma_1^2)$$

where $\sigma_0$ is the deviation type of a residue calculated between said current template and a corresponding template associated with said first prediction block; and where $\sigma_1$ is the deviation type of the residue calculated between said current template and said reference template, and wherein said first distortion is weighted relative to said second distortion by said coefficient in said linear combination.

5. A method, in a video encoder comprising:
   determining for said current block a first motion vector;
   identifying a first prediction block in a first reference image with said first motion vector;
   determining a second motion vector by template matching of a current template in a causal neighborhood of said current block;
   identifying a second prediction block in a second reference image with said second motion vector;
   coding said current block from said first and second prediction blocks in a stream of coded data;
   wherein the determining said second motion vector comprises minimizing a linear combination of first and second distortions, said first distortion being calculated between said first prediction block in said first reference image and said second prediction block in said second reference image and said second distortion being calculated between said current template in said causal neighborhood of said current block and a reference template in said second reference image.

6. The method for coding according to claim 5, wherein said first distortion is weighted relative to said second distortion by a coefficient in said linear combination.

7. The method for coding according to claim 6, wherein said coefficient is coded in said stream of coded data.

8. The method for coding according to claim 5, further comprising calculating a coefficient according to the following formula:

$$\sigma_1^2/(\sigma_0^2+\sigma_1^2)$$

where $\sigma_0$ is the deviation type of a residue calculated between said current template and a corresponding template associated with said first prediction block; and where $\sigma_1$ is the deviation type of the residue calculated between said current template and said reference template, and wherein said first distortion is weighted relative to said second distortion by said coefficient in said linear combination.

9. A decoding device comprising:
a decoder configured to decode, for said current block, a first motion vector from a stream of coded data;
an identifier configured to identify a first prediction block in a first reference image with said first motion vector;
a unit configured to determine a second motion vector by template matching of a current template in a causal neighborhood of said current block;
an identifier configured to identify a second prediction block in a second reference image with said second motion vector;
a unit configured to reconstruct said current block from said first and second prediction blocks;
wherein the unit configured to determine said second motion vector comprises a unit configured to minimize a linear combination of first and second distortions, said first distortion being calculated between said first prediction block in said first reference image and said second prediction block in said second reference image and said second distortion being calculated between said current template in the causal neighborhood of said current block and a reference template in said second reference image.

10. A coding device comprising:
a unit configured to determine for said current block a first motion vector;
an identifier configured to identify a first prediction block in a first reference image with said first motion vector;
a unit configured to determine a second motion vector by template matching of a current template in a causal neighborhood of said current block;
an identifier configured to identify a second prediction block in a second reference image with said second motion vector;
a coder configured to code said current block from said first and second prediction blocks in a stream of coded data;
wherein the unit configured to determine said second motion vector comprises a unit configured to minimize a linear combination of first and second distortions, said first distortion being calculated between said first prediction block in said first reference image and said second prediction block in said second reference image and said second distortion being calculated between said current template in said causal neighborhood of said current block and a reference template in said second reference image.

11. The coding device according to claim 10, wherein said first distortion is weighted relative to said second distortion by a coefficient in said linear combination.

12. The coding device according to claim 11, wherein the coder is further configured to code said coefficient in said stream of coded data.

13. The coding device according to claim 10, wherein the unit configured to determine said second motion vector is further configured to calculate a coefficient according to the formula:

$$\sigma_1^2/(\sigma_0^2+\sigma_1^2)$$

where $\sigma_0$ is the deviation type of a residue calculated between said current template and a corresponding template associated with said first prediction block; and where $\sigma_1$ is the deviation type of the residue calculated between said current template and said reference template, and wherein said first distortion is weighted relative to said second distortion by said coefficient in said linear combination.

14. The decoding device according to claim 9, wherein said first distortion is weighted relative to said second distortion by a coefficient in said linear combination.

15. The decoding device according to claim 14, wherein said decoder is further configured to reconstruct a coefficient from said stream of coded data.

16. The decoding device according to claim 9, wherein the unit configured to determine said second motion vector is further configured to calculate a coefficient according to the formula:

$$\sigma_1^2/(\sigma_0^2+\sigma_1^2)$$

where $\sigma_0$ is the deviation type of a residue calculated between said current template and a corresponding template associated with said first prediction block; and where $\sigma_1$ is the deviation type of the residue calculated between said current template and said reference template, and wherein said first distortion is weighted relative to said second distortion by said coefficient in said linear combination.

17. The method according to claim 2, wherein said coefficient is equal to 0.5.

18. The method for coding according to claim 6, wherein said coefficient is equal to 0.5.

19. The coding device according to claim 11, wherein said coefficient is equal to 0.5.

20. The decoding device according to claim 14, wherein said coefficient is equal to 0.5.

* * * * *